United States Patent [19]

Sampson

[11] Patent Number: 5,076,615
[45] Date of Patent: Dec. 31, 1991

[54] APPARATUS FOR CONNECTING AN ELASTIC HOSE TO A SYSTEM WITH AN ANTI-HOSE ROTATION SHAPED HOLLOW BODY

[76] Inventor: Richard K. Sampson, 5221 S. County Rd. 7, Fort Collins, Colo. 80525

[21] Appl. No.: 411,905

[22] Filed: Sep. 25, 1989

Related U.S. Application Data

[63] Continuation of Ser. No. 157,897, Feb. 19, 1988, abandoned.

[51] Int. Cl.$^5$ .............................................. F16L 33/20
[52] U.S. Cl. ..................................... 285/253; 285/259
[58] Field of Search .............. 285/253, 259, 178, 176, 285/177, 332, 240, 239

[56] References Cited

U.S. PATENT DOCUMENTS

| | | | |
|---|---|---|---|
| 185,896 | 1/1877 | Curtis | 285/259 |
| 2,139,745 | 12/1938 | Goodall | 285/259 |
| 2,147,355 | 2/1939 | Scholtes | 285/259 |
| 2,479,499 | 8/1949 | Le Clair | 285/259 |
| 2,937,892 | 5/1960 | Prescott, Jr. | 285/259 |
| 4,330,142 | 5/1982 | Paini | 285/259 |
| 4,603,888 | 8/1986 | Goodall et al. | 285/259 |
| 4,790,569 | 12/1988 | Chaffee | 285/242 |

FOREIGN PATENT DOCUMENTS 3125351  1/1983  Fed. Rep. of Germany ...... 285/241

*Primary Examiner*—Eric K. Nicholson
*Attorney, Agent, or Firm*—Luke Santangelo

[57] ABSTRACT

A fitting is described for connecting an elastic hose (152) to a system through which a fluid is transmitted. The fitting, based on common barbed fittings, has a non-circular or angled conical surface which forms a smoothly curved line as the boundary between the conically-shaped surface and the base of the barb. This serves as an integral way to resist rotation of hose (152), which engages hose (152) on its inner surface. The anti-rotation feature is designed in such a way as to minimize any tendency of the anti-rotating feature to diminish the sealing properties of the barb.

12 Claims, 3 Drawing Sheets

APPARATUS FOR CONNECTING AN ELASTIC HOSE TO A SYSTEM WITH AN ANTI-HOSE ROTATION SHAPED HOLLOW BODY

This is a continuation, of application Ser. No. 07/157,897, filed Feb. 19, 1988, now abandoned.

BACKGROUND OF THE INVENTION

Generally, the invention relates to barbed fittings and other such methods of attaching elastic hoses to a system for the transmission of fluids to or from the system. Specifically, the invention relates to hose barbs which are designed to resist rotation of the hose about the barb. The invention also concerns a method of manufacturing such fittings whereby such may be molded using existing molds which are modified to only a small extent.

For almost a century the technique of connecting an elastic hose to a system by means of a hose barb or other similar device has been known. In early efforts—such as U.S. Pat. No. 584,008 to Munson for a "Hose Splice"—the apparatus contained bulb-shaped end portions to retain the hose in a longitudinal direction. These early devices eventually evolved into the use of a hose barb in which a conically-shaped portion discretely decreases in diameter to effect a sharp deformation of the hose. This deformation resists any tendency of the hose to slip off the apparatus in the longitudinal direction. Such fittings have the characteristics of allowing an elastic hose to easily slide onto the fitting in one longitudinal direction and yet resist any tendency of the hose to slide off the fitting in the opposite longitudinal direction. These properties, together with a desire to adequately seal the hose to the fitting, have been fundamental to hose barbs in general.

As hose barbs developed, the focus of their development lay primarily in three areas. First, efforts were made to enhance the property of the fitting to resist removal of the hose in the longitudinal direction. Second, efforts were made to enhance the sealing properties whereby the hose seals against the fitting. Third, the focus of efforts has been to design the fitting so as to enhance its structural integrity without unduly restricting the amount of fluid allowed to flow within the fitting. Barbed fittings have also been designed to grip the external surface of the hose. Combinations of both internal surface gripping and external surface gripping was disclosed in 1950 with the U.S. Pat. No. 2,516,583 to Moore entitled "Hose Coupling Device." The Moore patent demonstrates a supposed refinement in hose barbs whereby numerous teeth or barbed projections are utilized on both internal and external surfaces in order to effectuate the desired resistance to longitudinal slippage. As the Moore patent states, the hose coupling device "effectively seal[s] the end face of the hose in the coupling by a powerful axial thrust."

Recently, it has become understood that any tendency of a hose to rotate about the fitting was undesirable. This aspect appears to have been first publicly appreciated in 1974 by U.S. Pat. No. 3,817,561 to Kay for a "Pipe Joint Connector." As the Kay patent discloses, an annular ring of angular teeth contact the outer surface of a pipe so as to resist rotation of the pipe within the connector body about its central axis. These angular teeth are designed to deform the outer surface of the hose to a diameter equal to the diameter of a separate smooth barb which effectuates sealing of the pipe to the fitting. Both the fact that the Kay invention utilized angular teeth and the fact that these teeth deformed the pipe to a diameter equal to the smooth barb have inherent limitations with respect to sealing and wear which are overcome by the present invention. Those facts also demonstrate that the principles and problems governing this art have not been appreciated or understood prior to the present invention. Undoubtedly, even before the utilization of the invention described by the Kay patent, external clamping devices—initially used merely to improve retention in the longitudinal direction of a hose on a fitting—have unintentionally resulted in some secondary fashion to minimize any tendency of a hose to rotate about a fitting. This unappreciated result is fundamentally different from the present invention because it relies solely on increased friction forces rather than deformation of the elastomer itself. Frictional forces generated by the elastomer decay over time due to elastomer relaxation, whereas anti-rotation effects due to deformation (as in the present invention) actually increase over time due to elastomer hardening with age.

The fact that barbed fittings have been the subject of improvement for many years and yet those skilled in the art have almost totally ignored the aspect of rotation of the hose about the fitting is directly a result of the fact that until the present invention the problem of rotation of a hose about the fitting has not been fully understood. Allowing development of the present invention was the recognition that almost every lateral flex of the hose causes some degree of twist within the hose itself. This translates into rotation of the hose about the barb. In situations where a hose has rotation tendencies, those tendencies not only degrade the seal between the hose and the fitting but also the resistance to longitudinal slippage. This is due to the fact that even the apparently "smooth" maximum circumference of typical hose barbs unavoidably contains microscopic imperfections. The elastomer of the hose effects a seal by conforming to such microscopic imperfections.

Any rotation of the hose about the fitting causes three synergistic effects which are undesirable. First, rotation destroys the conformation of the elastomer to the microscopic imperfections and thus degrades the seal between the hose and the fitting. Second, the microscopic imperfections act as teeth and saw into the hose, thus increasing the surface area over which the seal is effected. This reduces the pressure along the seal and degrades its properties. Third, the sawing action causes degradation of the elastic properties of the elastomer in the most important region—in the vicinity of the seal. Of particular importance in this regard is the property of elastomers which makes them notch-sensitive such that a small cut in any surface tends to drastically reduce the material's resistance to tear along that cut. The destruction of the capability of the elastomer to conform to the microscopic imperfections then further degrades the seal. Rotation of the hose about the fitting is thus extremely undesirable because it initiates these synergistic effects which combine to destroy the sealing of the hose to a system.

Until the present invention it was not understood that resistance to such rotation is so critical to maintaining the integrity of the seal between the hose and the fitting, and, if accomplished by the fitting itself, must be accomplished in a manner that does not detract from the sealing tendencies of a typical hose barb fitting. Because those skilled in the art appear not to have recognized the combination of these two elements prior to the present invention, their prior efforts were not in the direction of the present invention. This rationale seems particularly demonstrated by the facts that the Kay patent—which appears to be the first to even mention the aspect of rotation of the hose about the fitting—is relatively recent when compared to the entire amount of time that barbed fittings have been utilized and the fact that even the device described by the Kay patent does not resist rotation in a manner which has no tendency to reduce the integrity of the seal between the hose and the fitting.

SUMMARY OF THE INVENTION

It is an object of the present invention to provide an apparatus which effectively allows attachment of an elastic hose to a system and which resists rotation of the hose about the fitting without having a tendency to reduce the integrity of the seal between the hose and the fitting.

It is also an object of the invention to provide a means for resisting rotation of a hose about a fitting, such means contacting the hose on the inner surface of the hose.

Additionally, it is an object of the present invention to provide a means for resisting rotation which may be inexpensively added to molded products through minor modification of existing molds. It is also an object of the invention to provide a means for resisting rotation which takes advantage of the elastic properties of a hose to maximize both its sealing and anti-rotation properties.

It is another object of the invention to provide a means for resisting rotation of a hose about a fitting which minimizes any tendency to cut the hose in the event its anti-rotation properties are overcome.

Naturally, further objects of the invention are disclosed in other areas of the specification and claims.

DETAILED DESCRIPTION OF PREFERRED EMBODIMENTS

Figure 1:
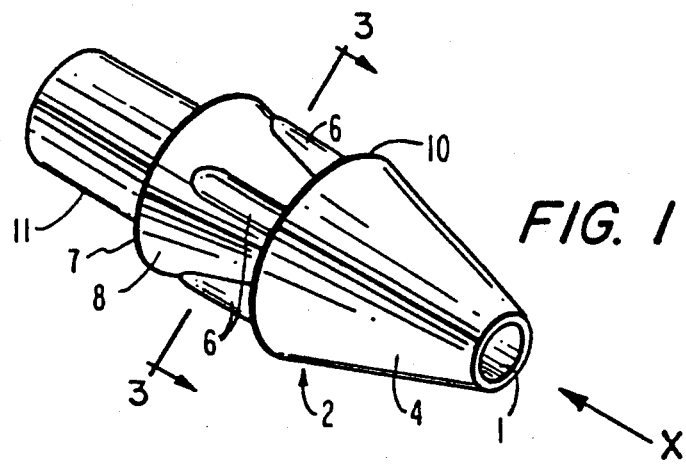
FIG. 1 is a perspective view of an embodiment of the invention having multiple barbs and showing ribs along the second barb.
Figure 4:
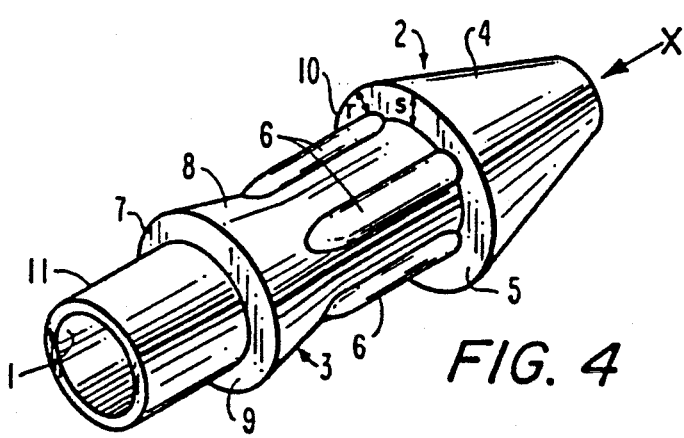
FIG. 4 is a perspective view of a variation to the embodiment shown in FIG. 1.

As can be seen from the drawings, the basic concepts of the present invention may be embodied in many different ways. FIGS. 1 and 4 show embodiments where the stem (11) of the hollow body (1) can be seen. Integral to the hollow body (1) is a first barb (2) and a second barb (3). Each of the barbs (2) and (3) are characterized by a conically-shaped surface (4) and (8) and a base (5) and (9), respectively. On the conically-shaped surface (8) of the second barb (3) are several ribs (6). These ribs (6) extend from the base (5) of the first barb (2) to a point short of the boundary (7) between the conically-shaped surface of the second barb (3) and the base of the second barb (3). The embodiment shown in FIG. 4 differs from that shown in FIG. 1 in that the embodiment in FIG. 4 includes a short cylindrical section in between the first barb (2) and the second barb (3). This cylindrical section allows the ribs (6) to extend over a longer distance.

This fitting is typically attached to a system by insertion of the stem (11) into the system in conjunction with either gluing, screwing, or other such attachment means. The stem (11) may or may not be inserted to a point which may allow contact of some portion of the base (9) of the second barb (3) against some surface of the system. An elastic hose then is attached to the fitting by sliding the hose in the direction "X" over the conically-shaped surface (4) of the first barb (2) and over the conically-shaped surface (8) of the second barb (3), to the fullest extent possible. The fitting then resists any tendency of the hose to slide in a direction opposite of "X" by deforming the inner surface of the hose in a maximum amount along the boundary (10) between the conically-shaped surface (4) of the first barb (2) and its base (5). This maximum deformation along the boundary (10) also creates a seal between the hose and the fitting whose integrity is enhanced by the fact that the boundary (10) affects a very small surface area and thus serves to greatly increase the pressure between the fitting and the hose in this area. By contacting the inner surface of the hose rather than the outer surface, the effect of both retention in the longitudinal direction and sealing between the hose and the fitting is substantially enhanced. By contacting the inner surface rather than the outer surface the properties of both retention in the longitudinal direction and sealing to the system are substantially enhanced. This is a result of the fact that the tensile stress levels achievable within a hose are much greater than the compressive stress levels achievable within a hose. This is particularly true for thin-walled hoses. When the fitting is designed to contact the outer surface of a hose, compressive stresses tend to result in buckling of the hose. Obviously this has a discrete effect on the seal and on the longitudinal retention of the hose. Also, systems utilizing fittings designed to contact the inner surface of the hose (as in the present invention) are not dependent on fluid pressure to enhance the seal. The present invention is thus particularly suited to low pressure or even vacuum systems.

Figure 3:
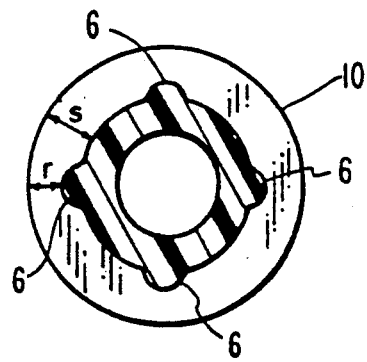
FIG. 3 is a cross-section view along a plane perpendicular to a central axis and passing through lines a—a in the embodiment shown in either FIG. 1 or FIG. 2.

As can be seen from the drawings in FIGS. 1, 3, and 4, the ribs (6) extend outward to a maximum diameter which is less than the maximum diameter of the first barb such as that shown on the boundary (10) of the first barb (2). This feature is unique to the present invention. Indeed, the invention to Kay referenced earlier failed to recognize the value of this feature. A radial distance (r) exists between the maximum "diameter" of the ribs (6) and the boundary (10) of the first barb (2). Similarly, a base distance (s) exists between the minimum diameter of either the stem (11) or, on multiply-barbed fittings, the minimum diameter of the conically-shaped surface (8) of the second barb (3) and the maximum diameter of the conically-shaped surface (4) of the first barb (2). The ratio of the radial distance (r) to the base distance (s) is critical to providing the means for resisting rotation in such a fashion as to minimize any tendency of the ribs (6) to reduce the integrity of the sealing characteristics between the hose and the fitting along the boundary (10) of the first barb (2). While the tendency of the ribs (6) to resist rotation increases as the maximum "diameter" of the ribs is increased, so, too, as the radial distance (r) is decreased the ribs (6) tend to reduce the integrity of the seal. For most industrial applications, it is believed that a ratio of the radial distance (r) to the base distance (s) from 0.20 to about 0.50 offers the optimum balance between anti-rotation tendencies and sealing tendencies.

The ribs (6) may exist in any number and may naturally have a variety of shapes and designs. Additionally, although the ribs are shown to extend from the base (5) of the first barb (2), such is merely a manufacturing expedient and so the rib or ribs may begin at some point off the base (5) of the first barb (2). As shown in FIG. 3, the ribs (6) have a rounded, external surface. Although other embodiments may employ a square or angled surface, a rounded surface affords ample resistance to rotation and affords the additional benefit of minimizing any tendency to cut or unduly wear the inner surface of the hose. As mentioned earlier, the recognition through the present invention of the fact that apparently "smooth" surfaces unavoidably contain microscopic imperfections which cut into an elastic hose when rotated about the fitting is fundamental to the present invention. Although the present invention is designed to resist such rotation, the realities of industrial use are such that in some applications forces may exceed the resistance to rotation. In these instances it is desirable to provide a fail-safe mode in which rotation does not result in cutting the hose to a degree much greater than that caused by the aforementioned microscopic imperfections. In the present invention this is accomplished by designing the means for resisting rotation, such as the ribs (6), with a curved, exposed surface in all areas which may contact the inner surface of the hose.

Figure 2:
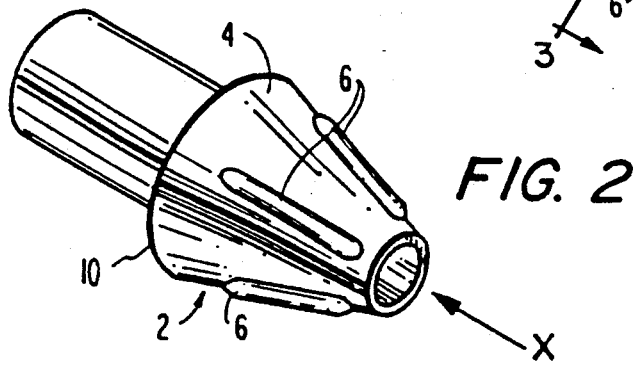
FIG. 2 is perspective view of another embodiment of the invention showing ribs on a single barb.

Referring now to FIGS. 1, 3, and 4, and also to FIG. 2, which shows only a first barb (2) with ribs (6), when a hose is placed on the fitting by sliding it over the barb in the direction "X", the hose is stretched and deformed by the conically-shaped surface (4) or (8) and by the rib or ribs (6). These deformations, by occurring on the inside surface of the hose, are resisted by the elastic properties of the particular hose employed, in particular the material's tensile strength. Since such tensile forces are typically a function of the displacement of the inner surface of the hose, it can be seen that the maximum tensile forces will occur in the vicinity of the boundary (10) or, in the case of a multiply-barbed fitting, at both boundaries (7) and (10). Additionally, increased tensile forces will occur by the displacement caused by the rib or ribs (6). Those forces in the vicinity of the ribs (6) serve to resist any rotation of the hose about the fitting. Although microscopic imperfections continue to exist on all areas of the fitting, resistance to rotation is increased by approximately an order of magnitude or more and so the cutting or increased wear caused by such microscopic imperfections is largely avoided and both the integrity of the seal between the hose and the fitting and the durability of the hose itself are substantially enhanced.

Figure 5:
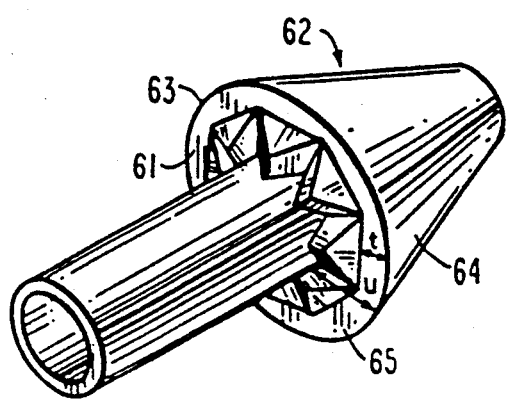
FIG. 5 is a perspective view of another embodiment of the invention where the means for resisting rotation is located on the base of the barb.

Referring to FIG. 5, an additional embodiment of the invention may be a fitting for connecting an elastic hose where the means for resisting rotation is located on the base (61) of a barb (62). In order to accomplish one of the important objects of the invention—namely providing a means for resisting rotation which does not diminish the integrity of the seal between the hose and the fitting—the means for resisting rotation does not extend to the circumference defined by the boundary (63) between the conically-shaped surface (64) of the barb (62). Naturally, the shape which the means for resisting rotation may take for this or any other embodiment is varied to allow for manufacturing considerations and whether the product is molded, turned, or manufactured in some other manner.

In considering the extent of alternatives to the design for the means for resisting rotation, it is important not only to consider the integrity of the seal between the hose and the fitting, but also the ability of the fitting to hold the hose and resist any tendency of the hose to slip off in a longitudinal direction. Accordingly, the embodiment shown in FIG. 5 may be designed so as to afford a discrete annular surface (65) which is in a plane perpendicular to the central axis of the fitting. As shown in FIG. 5, such annular surface (65) extends radially inward for a radial distance (t) before the means for resisting rotation begins. Naturally, the radial distance (t) of the annular surface (65) will be determined by balancing the tradeoffs between the need for resistance to longitudinal slippage and the need for resistance to rotation of the hose about the fitting for any particular application. Such is the case not only with the annular surface (65), but with the size, shape, and location of the means for resisting rotation as described herein.

As mentioned, the means for resisting rotation may terminate on a diameter which is less than the maximum diameter of the conically-shaped surface (64) by a radial distance (t). As in the embodiment described earlier in reference to FIG. 4 in which ribs (6) protrude from the conically-shaped surface (8) of the second barb (3), the radial distance (t) in the embodiment shown in FIG. 5 is some portion of the base distance (u). For typical industrial applications it appears that the optimum ratio of the radial distance (t) to the base distance (u) is from 0.20 to about 0.50.

Figure 6:
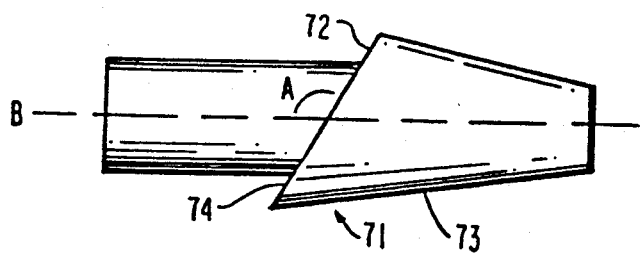
FIG. 6 is a side view of another embodiment of the invention in which the base of the barb is on a plane which forms an angle with respect to the central axis.
Figure 7:
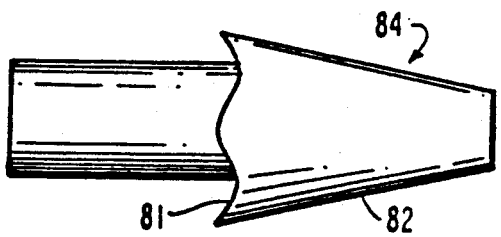
FIG. 7 shows an embodiment of the invention in which the boundary between the conically-shaped surface and the base of the barb is undulating.

FIG. 6 shows another embodiment of the invention. In this embodiment, a barb (71) has a boundary (72) defined by the intersection between the conically-shaped surface (73) of the barb (71) and the base (74) of the barb. Such boundary (72) exists in a plane which forms an angle (A) with respect to the central axis of the fitting (B). The seal between the hose and the fitting is effected along the boundary (72) which also causes resistance to rotation of the hose about the fitting. Because of the fact that the boundary (72) is in a plane which forms an angle (A), any rotation of the hose about the fitting would not only cause tangential slippage along the inner surface of the hose, but also effectively create longitudinal forces along the boundary (72). Again, the particular design chosen in this embodiment—specifically the value of the angle (A)—will be dictated by the application in which the fitting will be used. As the angle (A) approaches 90 degrees, it can be readily seen that the forces resisting longitudinal slippage between the fitting and the hose increase. As the angle (A) is increased from 90 degrees, the forces resisting rotation of the hose about the fitting increase. It is believed that for most industrial applications, an angle (A) from about 105 to 135 degrees offers an acceptable trade-off between the two tendencies. As the angle is increased beyond approximately 135 degrees, it is believed that for most applications the degradation of the sealing properties becomes unacceptable. Referring to FIG. 7, still another embodiment of the invention may exist in which the boundary (81) between the conically-shaped surface (82) and the base of the barb (84) is a smoothly undulating line such as a sinusoidal curve. In this embodiment, the amplitude of the undulations in the boundary (81) and its analogous frequency will involve trade-offs between the integrity of the seal between the hose and the fitting and the tendency of the embodiment to resist rotation of the hose about the fitting.

Figure 8:
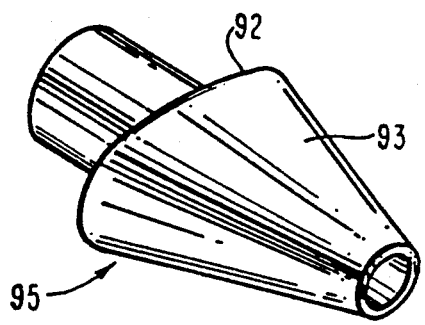
FIG. 8 is a perspective view of another embodiment of the invention which does not have a circular cross section.
Figure 9:
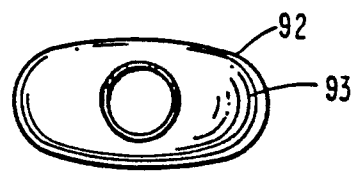
FIG. 9 is a cross-section view through a plane on line b—b in FIG. 8.

Still another embodiment of the invention is shown in FIGS. 8 and 9 depicting a barb having a non-circular cross section. As shown in these figures, such an embodiment involves a barb (95) in which the boundary (92) between the noncircularly-shaped surface (93) and the base is not circular in cross section. As shown in FIG. 9 the boundary (92) presents varying radii as the angle varies about the central axis. This deforms the hose in a noncircular fashion. This deformation may be continuous so as to afford an effective seal between the hose and the fitting around the boundary (92). Naturally the non-circular shape may take a variety of forms such as an ellipse, oval, or other non-circular shape.

Figure 10:
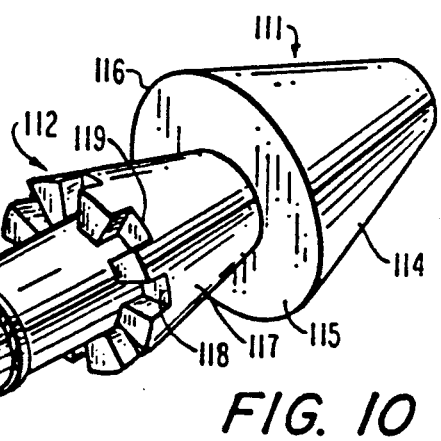
FIG. 10 is a perspective view of another embodiment of the invention in which the boundary between the conically-shaped surface and the back side of the barb is discretely discontinuous.

Somewhat similar to the embodiment shown in FIG. 7 is an embodiment as shown in FIG. 10. This embodiment involves a multiply-barbed fitting which has a first barb (111), a second barb (112), and a stem (113) portion of a hollow body (130). The first barb (111) has a conically-shaped surface (114) and a base (115) which join at a circular boundary (116). The second barb also has a conically-shaped surface (117), however, it also has a discretely discontinuous base (118). The boundary between the conically-shaped surface and the discretely discontinuance base is a jagged line (119). As can been seen from FIG. 10, the discretely discontinuous base (118) of the second barb (112) is discontinuous in longitudinal direction. As can be seen from comparison with the embodiment shown in FIG. 8, this embodiment also effects resistance to rotation of the hose about the fitting in the design of the boundary (119) between the conically-shaped surface (117) of the second barb (112), and the discretely discontinuous base (118) of the second barb (112). As was mentioned earlier, the fact that the means for resisting rotation is discretely discontinuous as opposed to merely undulating, poses advantages in resistance to rotation. However, as also mentioned earlier, the advantages in the present embodiment are gained by trading off the disadvantage of not having a fail-safe mode in the event a hose is forced to rotate about the fitting. The embodiment may also have an integral ring (131) as a stop to prevent insertion of the stem (113) to a point where the system which the fitting is attached contacts the discontinuous base (118). This prevents interference by the system with the anti-rotation properties of the fitting.

Referring to the embodiment shown in FIGS. 1, 4, and 10, it can be seen that each of these embodiments incorporates more than one barb. Each of these embodiments also show a first barb having a conically-shaped surface such as (114) in FIG. 10 and a base such as (115) in FIG. 10. The boundaries between such conically-shaped surfaces and their respective bases are the aspects which effect a seal between the hose and the fitting. Although many inventions have existed which contain multiple barbs, analysis of the relationship between rotating forces, longitudinal forces, and the seal between the hose and the fitting have led to the discovery that the most effective way to seal a hose to such a barbed fitting is to cause the seal on only one barb and to have that barb be the first barb on the fitting. Rather than creating additional seals, it has been discovered that multiple barbs tend to interfere with each other and thus create a less desirable seal between the hose and the fitting. As may be seen in the depictions of the embodiments shown in FIGS. 1, 4, and 10, the maximum diameter of the second barb—for instance, the boundary (7) shown in FIG. 1—may be less than the maximum diameter of the first barb—for instance, the boundary (10) in FIG. 1. This variation in diameters minimizes any tendency of the second barb to reduce the integrity of the seal between the hose and the fitting. Naturally the second barb may have a maximum diameter equal to that of the first barb for manufacturing reasons as will be mentioned later; however, such a design may not afford the best sealing tendencies. Naturally, when multiple barbs are desired, multiple means for resisting rotation may be employed on all barbs, on alternating barbs, or on any combination of barbs.

Figure 11:
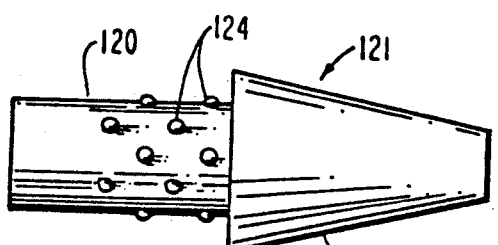
FIG. 11 is an embodiment of the invention having protrusions on the stem.
Figure 12:
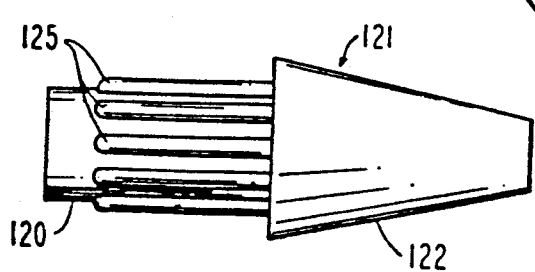
FIG. 12 is an embodiment of the invention having at least one rib on the stem.

Referring now to FIGS. 11 and 12, there are shown two additional embodiments in which the means for resisting rotation is located on the stem (120) of the fitting. Each fitting shows a barb (121) which has a conically-shaped surface (122) and has a base. The elastic properties of the hose then tend the inner surface of the hose to contact the stem (120) and the means for resisting rotation. On FIG. 11, the stem contains one or more protrusions (124) which resist rotation of the hose about the fitting. On FIG. 12 the means for resisting rotation is one or more ribs (125). Additionally the means for resisting rotation may be cross-hatching placed on the stem (120). As is shown, the means for resisting rotation may terminate before the end of the stem (120) so as to permit unobstructed insertion of the stem (120) into the particular system involved.

Figure 13:
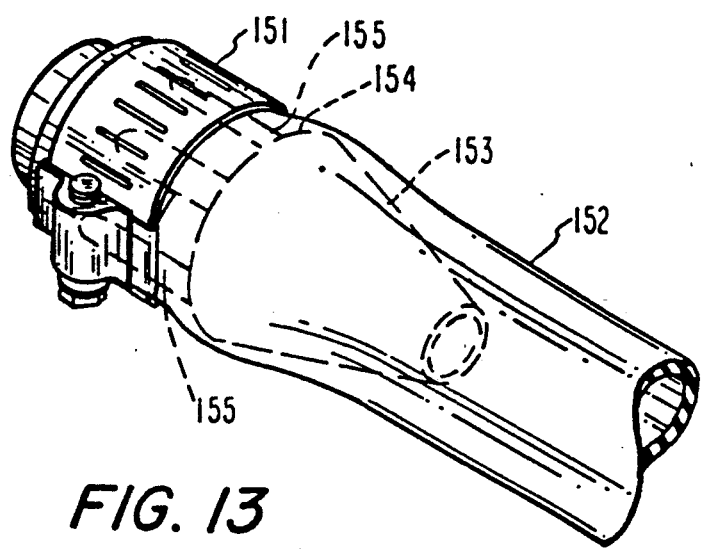
FIG. 13 is a cut-away view of the embodiment of the invention shown in FIG. 1 showing a hose and a hose clamp as attached.

Now referring to FIG. 13, there is shown a clamp (151) which is placed around a hose (152) which has been slid onto any one of the fittings described in this invention. In FIG. 13 the fitting shown is one such as shown in FIG. 1. The fitting shows a conically-shaped surface (153) which has deformed the hose in the vicinity of the boundary (154) at the maximum diameter of the conically-shaped surface (153). It also shows that the hose has been deformed by at least one rib (155) and that the tensile forces caused by the hose (152) in the vicinity of the rib (155) are enhanced by a circumferential clamp (151). Not only does the clamp enhance any resistance of the hose (152) to rotation about a ribbed fitting. it also enhances retention of the hose in the longitudinal direction; the latter being its sole historical purpose.

A substantial benefit to the present invention is the fact that almost all of the embodiments shown may be manufactured by injection molding or casting and may be manufactured with only minor modification of existing tooling. As is well known in the art, products such as hose barbs are frequently molded of materials such as plastics. The molding process involves a mold frequently having two or more removable sections which, when placed together, form a cavity defining the surfaces of the particular product to be molded. Into the mold is injected high pressure and high temperature molten material such as plastic. This plastic forms the device and then upon cooling the mold is separated and the product removed. Since molds exist for common hose barbs in many variations, many of the means for resisting rotation have been designed so that they may be manufactured by merely removing material from existing molds. For instance, referring to the embodiment shown in FIG. 1, merely milling the mold using a ball end tool and moving that tool parallel to the longitudinal axis of the mold will create ribs (6) as shown in FIG. 1. In similar fashion, many of the other embodiments shown may be formed using either milling or electronic discharge techniques to remove some of the metal in the mold which defines the outer surface of the product to be formed. An incidental advantage to such design is that because such designs add material to the final product forms, such as the ribs shown in FIGS. 1, 3, 4, 12, and 13, these end products will be structurally superior to the original product.

I claim:

1. An apparatus for connecting an elastic hose to a system comprising:
   a. a hollow body having an inner surface and a central axis;
   b. a stem, a portion of which serves as a means for connecting said body to a system;
   c. a barb having a conically-shaped surface, a base terminating said conically-shaped surface, and an outer periphery formed at the intersection of the base and the conically-shaped surface said outer periphery having a circumferential length along which said hose seals to the system and which also holds said hose in the direction of the central axis, said barb being integral to the body and being disposed so as to engage the inner surface of said elastic hose; and
   d. a means for resisting rotation of said hose about said body, wherein said means is located only on said outer periphery of said barb, and is disposed so as to engage the inner surface of said elastic hose, and wherein said means for resisting rotation smoothly deforms the inner surface of said elastic hose along said outer periphery such that the circumferential length of said outer periphery forms a smoothly curved non-circular line.

2. An Apparatus for connecting an elastic hose to a system as described in claim 1 wherein said means for resisting rotation is also the boundary between said conically-shaped surface and said base of the barb.

3. An Apparatus for connecting an elastic hose to a system as described in claim 2 wherein said boundary is located in a plane which is not perpendicular to said central axis of the body.

4. An Apparatus for connecting an elastic hose to a system as described in claim 3 wherein the angle between said plane and said central axis is less than 90 degrees but more than 45 degrees.

5. An Apparatus for connecting an elastic hose to a system as described in claim 2 wherein said boundary is an undulating line.

6. An Apparatus for connecting an elastic hose to a system as described in claim 1 wherein said means for resisting rotation comprises a barb having a non-circular cross section.

7. An Apparatus for connecting an elastic hose to a system as described in claim 1 and further comprising a clamp disposed to engage said outer surface of the hose in the vicinity of the means for resisting rotation.

8. An apparatus for connecting an elastic hose to a system as described in claim 1 and further comprising no more than one barb having said outer periphery along which said hose seals and which serves to hold said hose in the direction of the central axis.

9. An apparatus for connecting an elastic hose to a system as described in claim 1 wherein said outer periphery defines a plurality of radii extending from the central axis to said outer periphery and wherein the location of the starting point at the central axis of adjacent radii on the central axis continuously change along the central axis.

10. An apparatus for connecting an elastic hose to a system as described in claim 1 wherein said outer periphery defines a plurality of radii extending from the central axis to said outer periphery and wherein the length of adjacent radii continuously change along the central axis.

11. An apparatus for connecting an elastic hose to a system as described in claim 10 and wherein the location of the starting point at the central axis of adjacent radii on the central axis also continuously change along the central axis.

12. An apparatus for connecting an elastic hose to a system comprising:
   a. a hollow body having an inner surface and a central axis;
   b. a stem, a portion of which serves as a means for connecting said body to a system;
   c. a barb having a conically-shaped surface, a base terminating said conically-shaped surface, and an outer periphery formed at the intersection of the base and the conically-shaped surface said outer periphery having a circumferential length along which said hose seals to the system and which also holds said hose in the direction of the central axis, said barb being integral to the body and being disposed so as to engage the inner surface of said elastic hose; and
   d. a means for resisting rotation of said hose about said body, wherein said means is located only on said outer periphery of said barb, and is disposed so as to engage the inner surface of said elastic hose, and wherein said means for resisting rotation deforms the inner surface of said elastic hose along said outer periphery by defining a smooth closed loop along said circumferential length.

* * * * *